(12) United States Patent
Hollander

(10) Patent No.: US 6,302,255 B1
(45) Date of Patent: Oct. 16, 2001

(54) ROLLER TRACK FOR THE TRANSPORT OR STORAGE OF GOODS SUPPORTED THEREON

(75) Inventor: Rudolf Richard Hollander, Vorden (NL)

(73) Assignee: Dynamic Systems Engineering B. V. (NL)

( * ) Notice: Subject to any disclaimer, the term of this patent is extended or adjusted under 35 U.S.C. 154(b) by 0 days.

(21) Appl. No.: 09/595,237

(22) Filed: Jun. 16, 2000

(30) Foreign Application Priority Data

Jun. 18, 1999 (DE) ................................................ 199 27 852

(51) Int. Cl.[7] .................................................. B65G 13/00
(52) U.S. Cl. ........................................... 193/35 R; 193/37
(58) Field of Search ...................................... 193/35 R, 37

(56) References Cited

U.S. PATENT DOCUMENTS

| | | | | |
|---|---|---|---|---|
| 3,915,275 | * | 10/1975 | Specht | 193/35 R |
| 4,681,215 | * | 7/1987 | Martin | 193/37 X |
| 5,048,661 | * | 9/1991 | Toye | 193/35 R |
| 5,857,554 | * | 1/1999 | Toye | 193/35 R |

FOREIGN PATENT DOCUMENTS

| | | |
|---|---|---|
| 1 208 687 | 1/1963 | (DE) . |
| 1 506 968 | 7/1969 | (DE) . |
| 71 23 917 | 11/1972 | (DE) . |
| 0 423 415 A1 | 4/1991 | (EP) . |
| 0 621 219 A1 | 10/1994 | (EP) . |
| 0 692 440 A1 | 10/1994 | (EP) . |
| 0 739 833 A1 | 10/1996 | (EP) . |
| 06293424A | 10/1994 | (JP) . |
| 08324749 A | 12/1996 | (JP) . |

* cited by examiner

Primary Examiner—James R. Bidwell
(74) Attorney, Agent, or Firm—R. W. Becker & Associates; R. W. Becker

(57) ABSTRACT

A roller track is provided, for support thereon of goods, which includes a pair of profile members, each profile member having a length extent and a plurality of holes spaced from one another along its length extent and a plurality of rollers. The rollers are mountable in rotatable dispositions in which the rollers extend transversely between and are supported by the pair of profile members, each roller having at least one borehole which is at a respective axial end of the roller and extends in the direction of the roller axis. The roller track includes a plurality of retaining elements for retaining the rollers in their rotatable dispositions on the pair of profile members. Each retaining element is releasably mountable on one of the profile members and includes at least one axle oriented to extend perpendicularly to the length extent of the profile member upon mounting of the retaining element on the profile member. The free end of each axle is receivable in a respective borehole of a roller, and each retaining element includes a projection resiliently biased into engagement with a hole in the profile member upon mounting of the retaining element on the profile member.

10 Claims, 4 Drawing Sheets

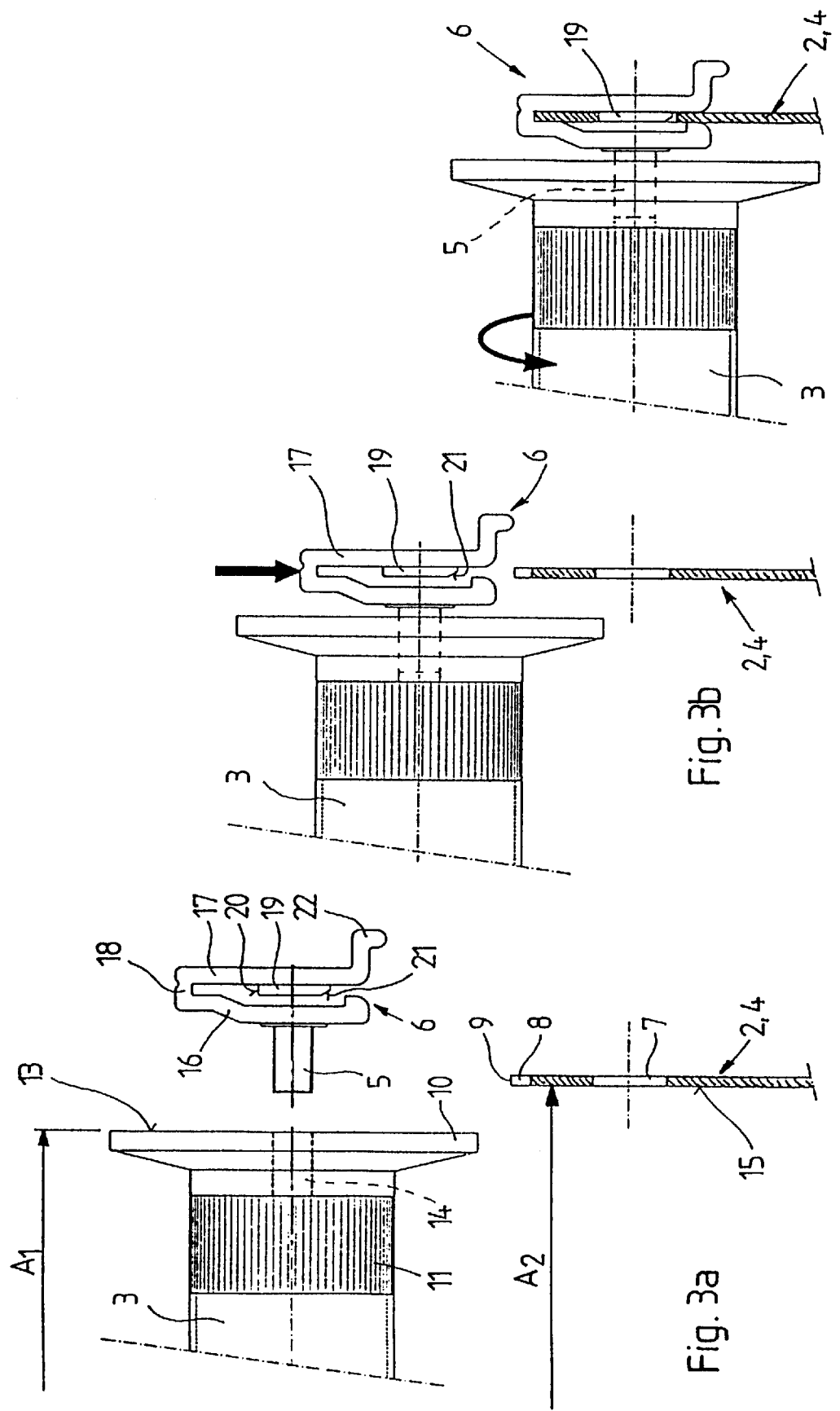

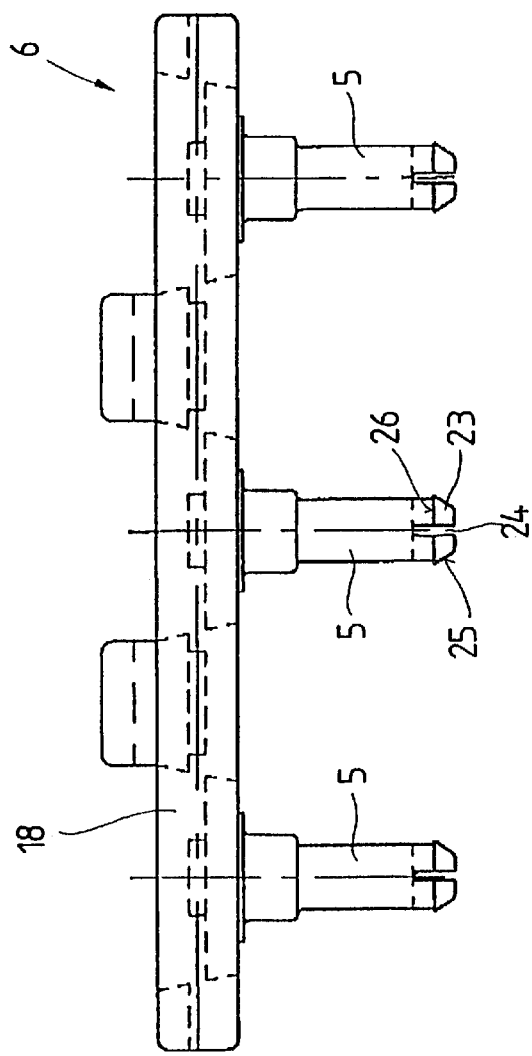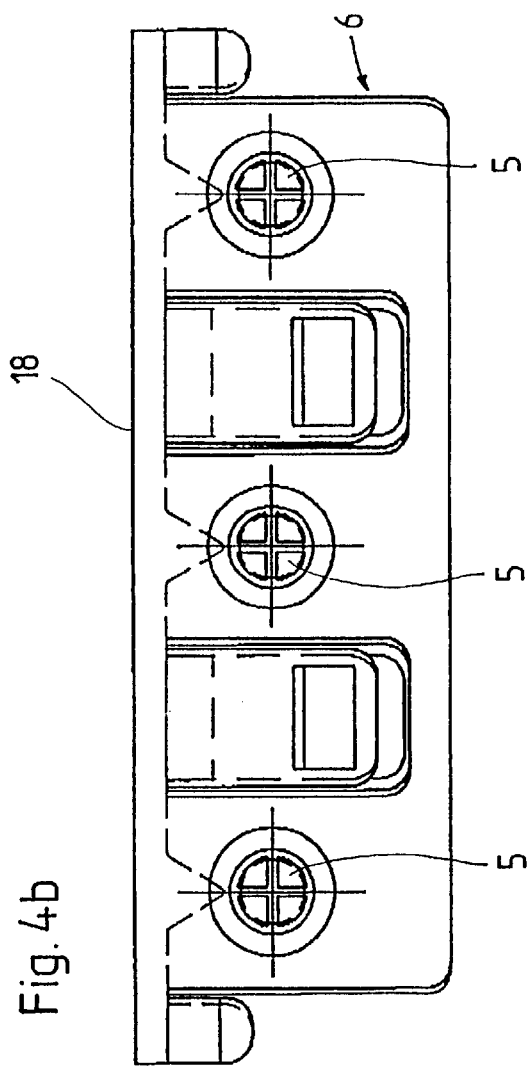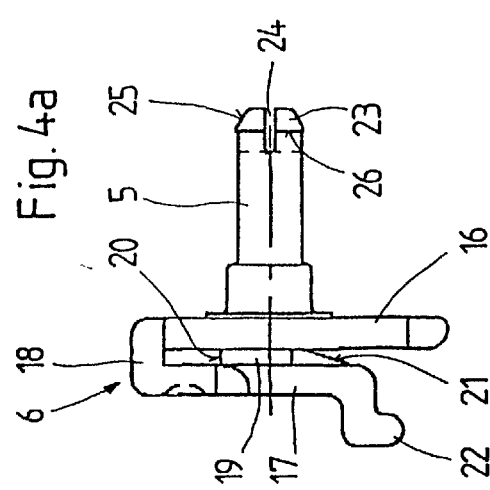

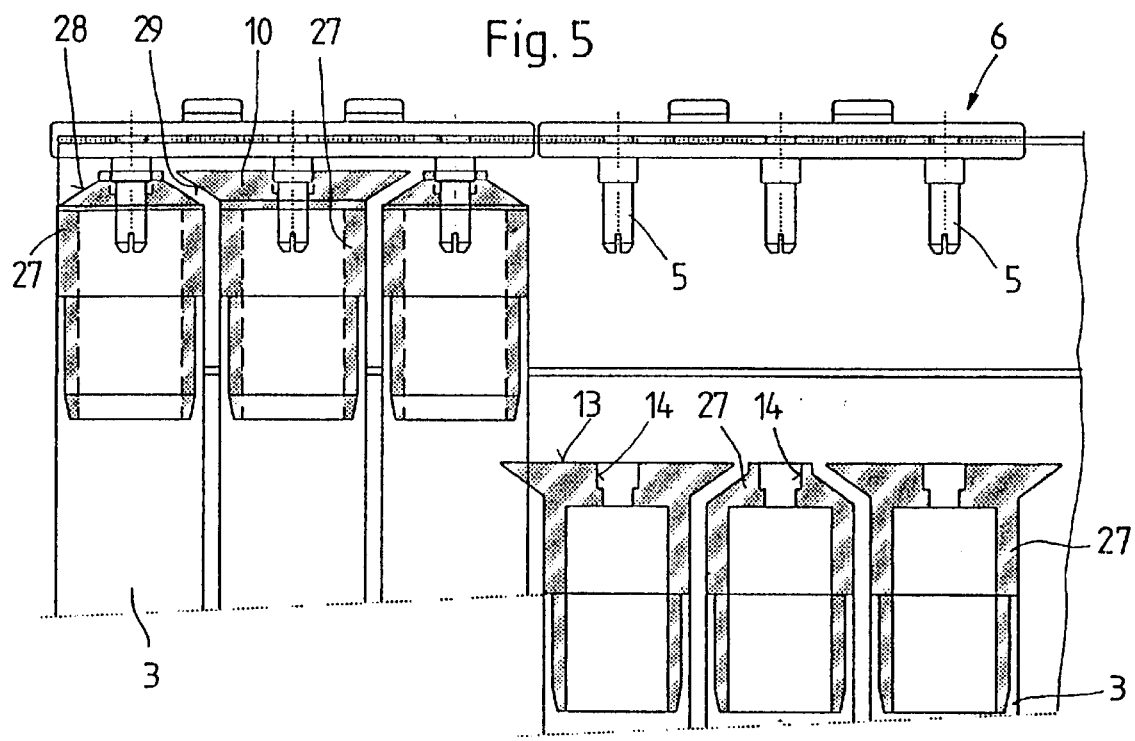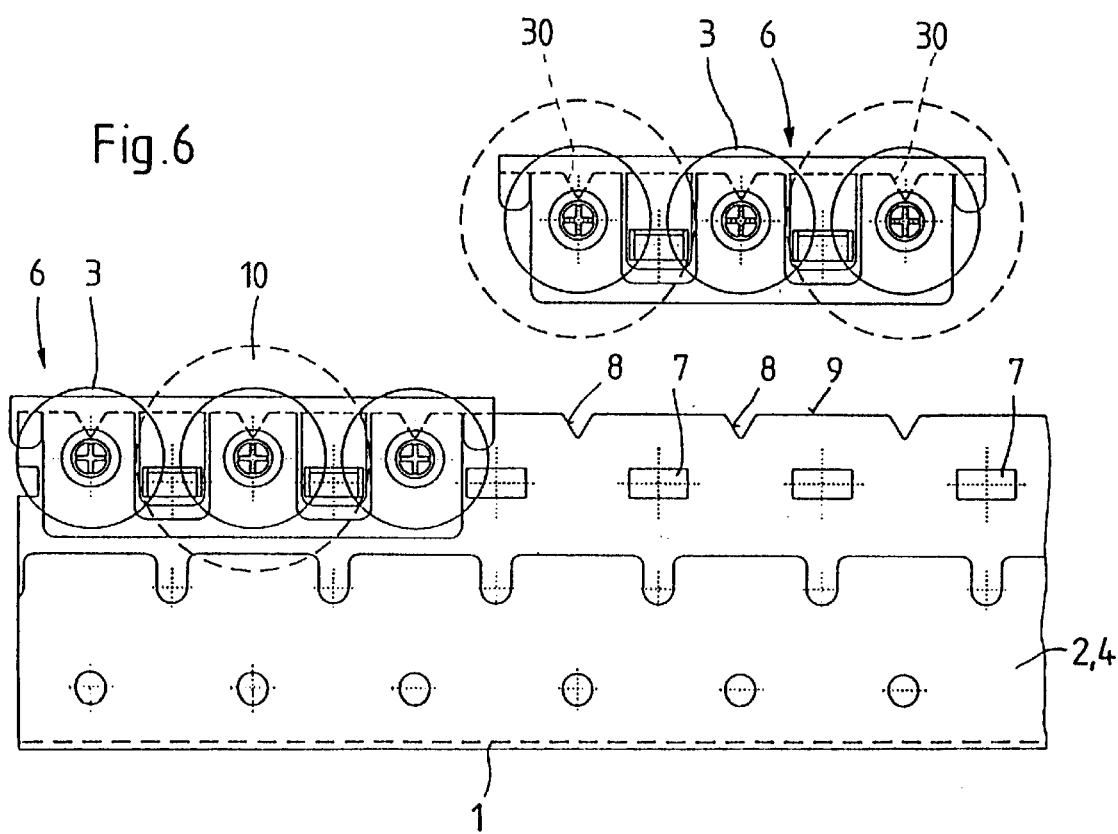

ROLLER TRACK FOR THE TRANSPORT OR STORAGE OF GOODS SUPPORTED THEREON

BACKGROUND OF THE INVENTION

The present invention relates to a roller track for the transport or storage of goods supported thereon and, more particularly, to a roller track having a plurality of serially arranged rollers whose axial ends are rotatably mounted to a pair of profiles extending in side-by-side spaced relation to one another, whereby the profiles are provided with a structure for securing the axles of the rollers which is in the form of cutouts or holes.

Roller tracks are used in the field of transport and in the field of storage. In their implementation in the field of storage, roller tracks are often slightly inclined such that the goods supported thereon tend to roll toward the lower end of the roller track in a self-driven manner due to the influence of gravity. Such roller tracks are used, for example, in the context of consignment warehousing.

One known type of roller track is configured with a plurality of smaller, neighboring as well as serially arranged, freely rollable rollers. It is also known to use cylindrically shaped rollers which extend entirely across the width of the respective roller track and define at the same time the support surface for the goods to be supported. The disposition of the rollers is accomplished by axles extending from both axial ends of the rollers which are mounted in metal profiles which extend pairwise in side-by-side spaced arrangement to one another. The metal profiles can, additionally, be extended to engage the sides of the goods to thereby act as side guides to the goods. To this end, the vertical flanges of the metal profile are lengthened so that they form an edge which is above the plane of the roller track.

For an economical installation of such roller tracks, a significant impact can be had by the installation of the rollers in fixedly supported portions of the roller track, that is, the installation of the rollers in metal profiles arranged in side-by-side spaced disposition to one another. Roller tracks of this type include rollers having inner springs which resiliently bias the axles in a direction axially outwardly of the roller. In the installation of the metal profiles, whose vertical flanges are provided with corresponding holes, each roller is initially disposed so that one of its axles is received in a respective hole of the profile, the roller is then pushed toward the respective profile which has just received the respective axle, and the axle at the other axial end of the roller is then brought into alignment with a respective hole on the other profile, whereupon the inner spring at the other axial end of the roller biases that axle into its seated disposition in the hole in the other profile. The removal or dismounting of the roller follows in a similar manner.

Rollers of the type just described are relatively expensive due to the provision of the additional springs as well as the relatively high assembly effort required to dispose the axially movable axles in the rollers. Additionally, the installation of such rollers and, especially, the automatic installation of such rollers, is difficult to configure, as the placement of the rollers between the profiles requires the simultaneous execution of various movements; specifically, the insertion of the axially movable axle into the roller on the one hand and the lowering or maneuvering of the other axial end of the roller into position on the other hand.

SUMMARY OF THE INVENTION

The present invention provides a roller track for the transport or storage of goods supported thereon which promotes ease of installation with the provision of rollers producible in an economical manner.

The roller track of the present invention is thus a roller track for support thereon of goods which includes a pair of profile members, each profile member having a length extent and having a plurality of holes spaced from one another along its length extent and a plurality of rollers. The rollers are mountable in rotatable dispositions in which the rollers extend transversely between and are supported by the pair of profile members, each roller having at least one borehole which is at a respective axial end of the roller and extends in the direction of the roller axis. The roller track also includes a plurality of retaining elements for retaining the rollers in their rotatable dispositions on the pair of profile members. Each retaining element is releasably mountable on one of the profile members and includes at least one axle oriented to extend perpendicularly to the length extent of the profile member upon mounting of the retaining element on the profile member. The free end of each axle is receivable in a respective borehole of a roller, and each retaining element includes a projection resiliently biased into engagement with a hole in the profile member upon mounting of the retaining element on the profile member.

The axles of the rollers of the roller track of the present invention are substantially fixed or rigid which leads to a reduced manufacturing cost. However, the substantially fixed or rigid axles, in contrast to those axles of the prior art, are not resiliently displaceable against the biasing force of a spring. Instead, the mounting of the axles on the roller track is accomplished in accordance with the present invention by means of retaining elements which extend transversely to the length of the rollers and which are releasably mountable on the profile of the roller track. Projections of the retaining elements are resiliently biased into seating engagement with holes in the profiles in order to avoid unintended release of the retaining elements from the profiles. The installation of the rollers in the roller track is accomplished by initially securing the retaining elements to the rollers and thereafter positioning both the retaining elements and the rollers in a simple movement from above into the pair of profiles arranged in side-by-side spaced disposition to one another, whereupon the resiliently biased projections of the retaining elements automatically seat into holes in the profile to secure the retaining elements and the rollers to the profiles. The installation can be effected with the aid of robot installers. In accordance with the present invention, each retaining element can be formed with a single axle or a plurality of axles so that, in the latter configuration, the rollers with the associated retaining elements can be installed in a groupwise manner.

According to one preferred embodiment of the roller track of the present invention, the retaining element is configured as a clip having spaced apart flanges which are resiliently biased toward one another, whereby, in the mounted condition of the clip on a profile, one of the clip flanges is disposed on the inside of the profile and the other flange is disposed on the outside of the profile, with the inside disposed flange having an axle while the outside flange is supported against the outside of the profile. In order to simplify the installation, it is advantageous to configure the projection to project from the inner side of the clip flange which is supported against the outside of the profile.

In the context of the erection and set-up of the roller track, the mounting of the retaining elements on the profile can be further simplified if the projection of the retaining element has, on its upper edge, a shoulder for releasably securedly engaging a cutout in the profile and if the projection has, on its lower edge, a lead-in incline. During force fit movement of the retaining element onto the profile, the projection is resiliently deflected and, upon alignment thereof with a hole in the profile, the projection moves automatically into the hole of the profile.

The securement of the projection of the clip in the hole of the profile must be released to effect the dismounting of the roller from the roller track. To this end, it is advantageous if the second flange of the clip is provided with a grip extending to a distance from the profile. The grip permits the gripping of the second flange of the clip on which the projection is formed. The grip in this manner thus makes possible an especially simple removal of the individual roller from the roller track including, if available, a removal with the assistance of the robot installer.

In accordance with another embodiment of the roller track of the present invention, the flanges of each clip are interconnected to one another by a bridging portion which is configured to be supported against the top edge of the profile. This acts to enhance the position stability of the retaining element on the profile. The position stability leads to justification of the pair of axles in an exact alignment to one another such that the roller is not skewed and can therefore freely roll without rolling resistance in its disposition on the roller track. An advantageous approach to ensuring position stability of the clip is to provide the top edge of the profile with recesses at spacings from the axles adapted to receive therein the bridging portions of the clips.

Since the retaining clips are mounted along the profiles, the possibility of configuring the top edge of the profiles as a smooth glide surface is foreclosed. The profiles can, however, in this configuration no longer act as side guide rails which guide the goods transported along the roller track. In accordance with a further embodiment of the roller track of the present invention, the roller track is configured such that the side guiding of the goods is not provided by the profiles but is, instead, provided by tracking crowns or flanges on at least some of the rollers and, preferably, on every second roller.

BRIEF DESCRIPTION OF THE DRAWINGS

FIG. 3a is an enlarged view of a portion of the profile shown in FIG. 1 and shows a roller at an initial stage of its mounting onto the profile;

FIG. 3b is a view of the profile shown in FIG. 3a and shows the roller at another stage of its mounting onto the profile;

FIG. 3c is a view of the profile shown in FIG. 3a and shows the roller at another stage of its mounting onto the profile;

FIG. 4a is a top plan view of another embodiment of the retaining element of the roller track of the present invention;

FIG. 4b is a front elevational view of the embodiment of the retaining element of the roller track of the present invention shown in FIG. 4a;

FIG. 4c is a side elevational view of the embodiment of the retaining element of the roller track of the present invention shown in FIG. 4a;

FIG. 5 is a top plan view, in partial section, of the embodiment of the retaining element of the roller track of the present invention shown in FIG. 4a and having rollers coupled thereto during one stage of its installation; and FIG. 6 is a front elevational view, in partial section, of the embodiment of the retaining element of the roller track of the present invention shown in FIG. 4a and having rollers coupled thereto during mounting of the retaining element onto the profile.

DETAILED DESCRIPTION OF PREFERRED EMBODIMENTS

Figure 1:
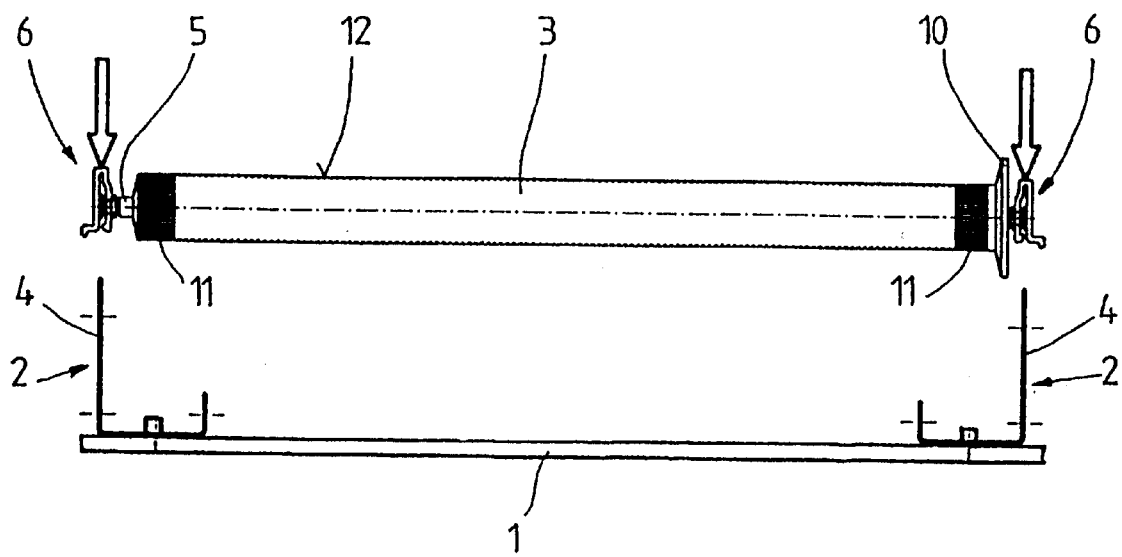
FIG. 1 is a front elevational view, in partial section, of a roller track of the present invention and shows a roller in a position during installation of the roller onto the roller track in which the roller is above the roller track shortly before the mounting of the roller onto the profiles of the roller track.

FIG. 1 shows a view along a roller track with a carrier 1 supported thereon, the roller track having profiles 2 arranged symmetrically to one another as well as a cylindrical roller 3 which in the configuring of the roller track must be disposed into position on the vertical flanges 4 of the pair of profiles 2.

The rollers 3 are freely rotatably mounted to the roller track by means of axles 5. The roller 3 can be provided with small roller bearings for receiving therebetween the axles 5 so as to thereby reduce the rolling resistance of the roller. The fixed mounting of the axles 5 is effected by retaining elements 6 formed as spring operating clips which are disposable on the vertical flanges 4 of the profiles 2 such that a resiliently biased portion of the clips is seated into the vertical flanges. In the illustrated embodiment, each retaining element 6 is provided with a respective single axle 5. However, the retaining element can also be configured with a length extent such that the retaining element can simultaneously support thereon two or three axles 5.

Figure 2:
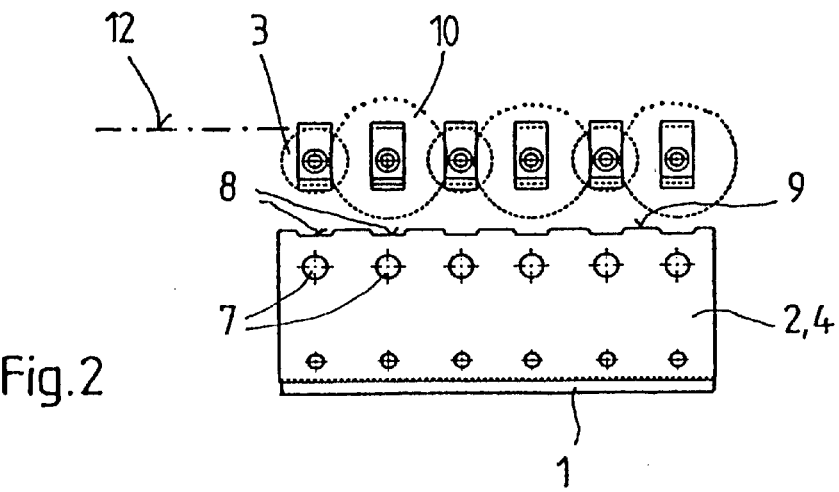
FIG. 2 is a side elevational view of the roller track shown in FIG. 1.

FIG. 2 offers a view which permits the form of the profile 2 to be seen. The vertical flanges of the profile are provided, in correspondence with the respective spacing of the rollers or the axles, with cutouts in the form of holes 7. Additionally, the profile 2 is provided, above each hole 7, with a cutout or recess 8 on its upper edge 9.

It can be further seen in FIG. 2 that every other or second roller 3 has fixedly secured thereto, at least at one end thereof, a tracking crown or flange 10. The tracking crowns operate to provide side guidance to the goods which are forwarded along the roller track. Traction enhancing cross cuts or sections 11 are provided on the rollers to facilitate an individual or groupwise braking of the rollers by means of suitable braking devices such that, in the operation of the roller track in an inclined serial feeding disposition, such as in a commission warehouse arrangement, an overly high speed of the goods being forwarded on the roller track can be prevented. The plane of transport 12, which the tracking crowns 10 of the rollers 3 extend above, is shown in broken lines in FIG. 2.

Reference is now made to FIGS. 3a, 3b, and 3c to further describe details of the retaining elements in the form of the clips 6 and their functioning in the context of the mounting of the rollers onto the roller track. The rollers shown in FIGS. 3a, 3b, and 3c are not provided with individual axles but, instead, are simply provided with a borehole 14 in an axial end surface 13 of the roller for receiving therein an axle 5. The borehole 14 can also be the inner surface of a roller bearing. The distance $A_1$ between the two axial end surfaces 13 of a roller 3 is only relatively slightly less than the distance $A_2$ between the opposed inner surfaces 15 of the pair of profiles 2. If the roller were instead itself provided with a fixed axle, it would not be possible to mount the roller into the profile 2 without some additional accommodation. In accordance with the present invention, however, the axles 5 are not set directly into the holes 7 in the profile 2 but, instead, are set into the holes 7 with the clips 6 serving as an intermediary accommodation.

Each clip 6 is comprised of a first flange 16, a second flange 17 extending substantially parallel to the first flange, and a bridging portion 18 interconnecting the first and second flanges. In the embodiments shown in FIGS. 3a, 3b, and 3c, the axle 5 is fixedly secured to the first flange 16. A projection 19 is provided on the inner side of the second flange 17 which faces the first flange 16 and the projection 19 is preferably integrally formed with the clip 6. The projection 19 is slightly smaller than the hole 7 of the profile 2. An insert shoulder 20 is formed on the upper edge of the projection 19 and a lead-in incline 21 is formed on the lower edge of the projection. The second flange 17 of the clip 6 has a grip 22 extending from its lower end in a direction away from the first flange 16.

The first flange 16 and the second flange 17 are configured with a spring property by which they are resiliently biased toward each other. To this end, the clip 6 is formed of an appropriate resiliently biasing material such as, for example, bent sheet steel or plastic. Independent from the material composition of the clip, the axle can be formed, for example, of metal or plastic. A metal axle offers a better wear resistance property while a plastic axle displays a good sliding or low frictional resistance property. In order to exploit the high stability of metal while also exploiting the good low friction resistance property of plastic, the axle can alternatively be formed as a composite. Such a composite can be, for example, a plastic axle having a metal core. A metal core of this type can, for example, in connection with injection molding of the clip/axle combination, be poured into place in molten condition.

FIGS. 3a, 3b, and 3c illustrate three stages of the process for mounting the roller on the profiles of the roller track. Initially, as shown in FIG. 3a, the clip 6, with the axle 5 fixedly secured thereto, is disposed in the borehole 14 of the roller 3. In the same manner, a clip is mounted to the other axial end of the roller. Thereafter, the roller 3, as shown in FIG. 1, is oriented horizontally above the pair of profiles 2 and moved downwardly thereonto such that the clips 6 engage the profiles. During this movement, the vertical flanges 4 of the profiles 2 are received between the first flanges 16 and the second flanges 17 of the clips such that the first flanges 16 are disposed on the inner side 15 of the profiles 2 and the second flanges 17 are disposed on the outer side of the profiles 2, as can be best seen in FIG. 3b. During the downward movement of the clip 6, the movement of the lead-in incline 21 along the vertical flange 4 of the profile 2 effects outward movement of the projection 19. Once the downward movement brings the projection 19 into alignment with the hole 7 of the profile 2, the projection 19 snaps into the hole 7 with the shoulder 20 engaging the top of the hole. At the same time, the bridging portion 18 is received into the recess 8 on the top edge 9 of the profile 2 such that the orientation of the clip 6 relative to the sidewise extent of the profile is brought into justification and a tilting or skewing of the axles is thereby foreclosed.

The dismounting or removal of the roller 3 follows in a reverse manner whereby the second flange 17 of the clip 6 is resiliently bent outwardly, via an outward pull on the grip 22, to an extent such that the shoulder 20 of the projection 19 is moved clear of the hole 7, releasing the lock engagement of the clip 6 with the profile 2. This dismounting process, as well as the mounting process of the roller in the profiles 2, can be performed by machine, in a fully automatic manner, using an installation device.

The embodiments shown in FIGS. 4a, 4b, 4c, 5, and 6 differ from the embodiment just described in that, in these other embodiments, the clip 6 is formed with a plurality of axles—namely, three axles—instead of one axle. The clip 6 in these embodiments is provided with a pair of second flanges 17 having thereon a pair of projections 19 operable to engage corresponding holes 7 in the vertical flanges of the profile. The axles 5 of these clips 6 differ from the axle of the just described embodiment in that these axles include, on their ends remote from the first flange 16 of the clip, a stop element 23. The stop element 23 is provided with a cross slot comprised of a pair of perpendicularly intersecting linear slots 24 each of which has a predetermined depth extent in the direction toward the first flange 16 of the clip. The stop element 23 also includes a lead-in incline 25 as well as a locking projection 26. The locking projection 26 extends radially outwardly beyond the outer diameter of the axle 5. During mounting of the axle into the corresponding borehole 14 in the axial end 13 of a roller 3, the presence of the slots 24 permits the stop element 23 to be initially compressed as the axle is moved into the borehole and the stop element 23 thereafter resiliently returns to its original dimension, whereupon the locking projection 26 engages the interior of the borehole 14 in a manner to prevent axle withdrawal. The lead-in incline 25 facilitates the mounting of the axle 5 in the corresponding borehole 14. A roller which has thus received an axle in this manner can only be separated therefrom by the application of at least a predetermined minimum force.

The bridging portion 18 of the clip 6 in the embodiments shown in FIGS. 4a, 4b, 4c, 5, and 6 is provided with a V-shaped projection 30 which is receivable in a correspondingly shaped cutout or recess 8 in the vertical flange 4 of a profile 2, this arrangement ensuring that the clip 6 can be mounted to the vertical flange 4 of a profile 2 in a manner which precludes free play.

FIG. 5 illustrates how three rollers 3 are secured to a clip 6 with three axles 5 in a pre-profile mounting stage of the roller mounting process. The rollers 3 in this embodiment include tubes 27 at their axial end regions. The axle mounted arrangement of these rollers is configured such that every other—namely, every second—tube is a tube having a tracking crown 10. Boreholes 14 are provided in the tubes 27 for receiving therein the axles 5. Those tubes 27 which do not include a tracking crown 10 have inwardly tapering surfaces 28 at their axial ends which are shaped in correspondence with the outwardly tapering surfaces 29 of the tracking crowns 10 of the respective neighboring rollers 3. This arrangement permits those rollers with the largest possible tracking crowns 10 to be mounted relatively closely to those rollers without tracking crowns to thereby provide a roller track with the largest possible tracking crowns.

As shown in FIG. 6, in the completion step of the process of mounting a roller 3 to the profiles 2, the clips 6 connected to the roller are disposed onto the vertical flanges 4 of the profiles 2 in a manner by which the clips lockingly engage the profiles. It can also be seen that the V-shaped projections 30 are received into the correspondingly shaped recesses 8 of the vertical flanges 4 of the profiles 2 to thereby secure the clips against movement relative to the vertical flanges. The projections 30 and the recesses 8, as well as those recesses 8 and the bridging portions 18 in the first described embodiment, operate to compensate for a deliberate free play between the holes 7 and the projections 19 which, although helpful for facilitating the mounting of the clip on the profile, would otherwise permit a relative movement between the clip and the profile 2 with respect to the length extent of the profile.

The specification incorporates by reference the disclosure of German priority document 199 27 852.0 of Jun. 18, 1999.

The present invention is, of course, in no way restricted to the specific disclosure of the specification and drawings, but also encompasses any modifications within the scope of the appended claims.

What is claimed is:

1. A roller track for support thereon of goods, comprising:
   a pair of profile members, each profile member having a length extent and having a plurality of holes spaced from one another along its length extent;
   a plurality of rollers mountable in rotatable dispositions in which the rollers extend transversely between and are supported by the pair of profile members, each roller having at least one borehole which is at a respective axial end of the roller and extends in the direction of the roller axis; and
   a plurality of retaining elements for retaining the rollers in their rotatable dispositions on the pair of profile members, each retaining element being releasably mountable on one of the profile members and including at least one axle oriented to extend perpendicularly to the length extent of the profile member upon mounting of the retaining element on the profile member, the free end of each axle being receivable in a respective borehole of a roller, and each retaining element including a projection resiliently biased into engagement with a hole in the profile member upon mounting of the retaining element on the profile member, wherein each retaining element includes a pair of spaced apart flanges resiliently biased toward one another, and wherein upon mounting of the retaining element onto the respective profile member one of the flanges is disposed on an inner side of the profile member and the other flange on an outer side of the profile member, with the axle extending from the flange disposed on the inner side of the profile member.

2. A roller track according to claim 1, wherein each roller includes a borehole at each axial end thereof and the length of the roller is less than the spacing of the pair of profile members from one another transverse to their length extents.

3. A roller track according to claim 1, wherein each retaining element includes a plurality of axles.

4. A roller track according to claim 1, wherein the projection of each retaining element extends from the other flange disposed on the outer side of the profile member toward the profile member.

5. A roller track according to claim 1, wherein each projection includes a shoulder on its upper surface and a lead-in incline on its lower surface.

6. A roller track according to claim 1, wherein each retaining element includes a grip extending from the other flange disposed on the outer side of the profile member and away from the profile member.

7. A roller track according to claim 1, wherein each retaining element includes a bridging portion interconnecting the pair of flanges and operable to engage the top edge of the respective profile member upon mounting of the retaining element thereon.

8. A roller track according to claim 7, wherein the top edge of each profile member is formed with a plurality of recesses, each recess for receiving therein a bridging portion of a respective retaining element.

9. A roller track according to claim 1, wherein at least one of the rollers includes a tracking crown.

10. A roller track according to claim 1, wherein each retaining element includes a single axle.

* * * * *